United States Patent
Dunfield et al.

[15] 3,667,016
[45] May 30, 1972

[54] REGENERATIVE BRAKING CIRCUIT FOR INDUCTION MOTORS

[72] Inventors: John C. G. Dunfield, Phoenix, Ariz.

[73] Assignee: Sperry Rand Corporation New York, N.Y.

[22] Filed: May 3, 1971

[21] Appl. No.: 139,477

[52] U.S. Cl. ............................................. 318/209, 318/231
[51] Int. Cl. .......................................................... H02p 3/18
[58] Field of Search ......................... 318/204, 209, 210, 231

[56] References Cited

UNITED STATES PATENTS

| | | | |
|---|---|---|---|
| 2,478,160 | 8/1949 | Momberg et al. | 318/210 |
| 2,710,372 | 6/1955 | McCleery | 318/209 X |
| 3,544,870 | 12/1970 | Muller | 318/231 |
| 3,571,681 | 3/1971 | Burns | 318/231 |

*Primary Examiner*—Gene Z. Rubinson
*Attorney*—S. C. Yeaton

[57] ABSTRACT

An induction motor is normally driven from a clock source acting through a power bridge inverter. Braking is accomplished by substituting a feedback signal for the clock signal. A tachometer in the feedback loop monitors the actual motor speed and cooperates to produce a feedback signal having a frequency characteristic that represents a predetermined fraction of the actual motor speed. When the feedback signal is applied to the motor through the power bridge inverter, the excitation frequency becomes and remains less than the frequency necessary to maintain the prevailing motor speed so that the motor operates in a negative slip mode in which it is quickly brought to a smooth stop.

6 Claims, 4 Drawing Figures

Patented May 30, 1972

INVENTOR
JOHN C. G. DUNFIELD
BY
*Joseph M. Roehl*
ATTORNEY

REGENERATIVE BRAKING CIRCUIT FOR INDUCTION MOTORS

BACKGROUND OF THE INVENTION

1. Field of the Invention

This invention relates to induction motors and more specifically to braking circuits for such motors.

2. Description of the Prior Art

Numerous braking schemes for smoothly and rapidly stopping induction motors are known in the prior art. Dynamic braking, for instance, is frequently used for stopping such motors.

Resonance braking methods are also known in the art. In these methods, the kinetic spin energy is used to introduce resonance in a braking circuit by matching external capacitors to the inductance parameters of the motor so as to produce oscillations over a narrow speed range. The speed range is extended by adjusting the capacitance as the speed decreases. Such resonance means tend to be bulky and unreliable.

The regenerative braking system of the present invention produces higher torque per ampere than the dynamic braking system and operates more reliably than the passive resonance system.

SUMMARY OF THE INVENTION

Braking of an induction motor is accomplished by exciting the motor at a frequency that is lower than the normal excitation frequency and which decreases as the motor decelerates so as to operate the motor in the negative slip region.

DESCRIPTION OF THE PREFERRED EMBODIMENTS

Induction motors normally operate in a positive slip region wherein the stator magnetic field is caused to rotate at a speed in excess of the rotor speed so as to produce a motoring torque. For any given rotor speed, there is one excitation frequency in which maximum accelerating torque will be produced.

Similarly, it can be shown that if an induction motor is excited at a frequency such that the resultant magnetic field rotates at a speed less than the rotor speed, a braking torque is produced. For any given rotor speed, there is a corresponding excitation frequency that will produce maximum braking torque. As a practical matter, the maximum braking torque has been observed to occur when the motor excitation frequency produces a rotating magnetic field that rotates at one-half the rotor speed.

Figure 1:
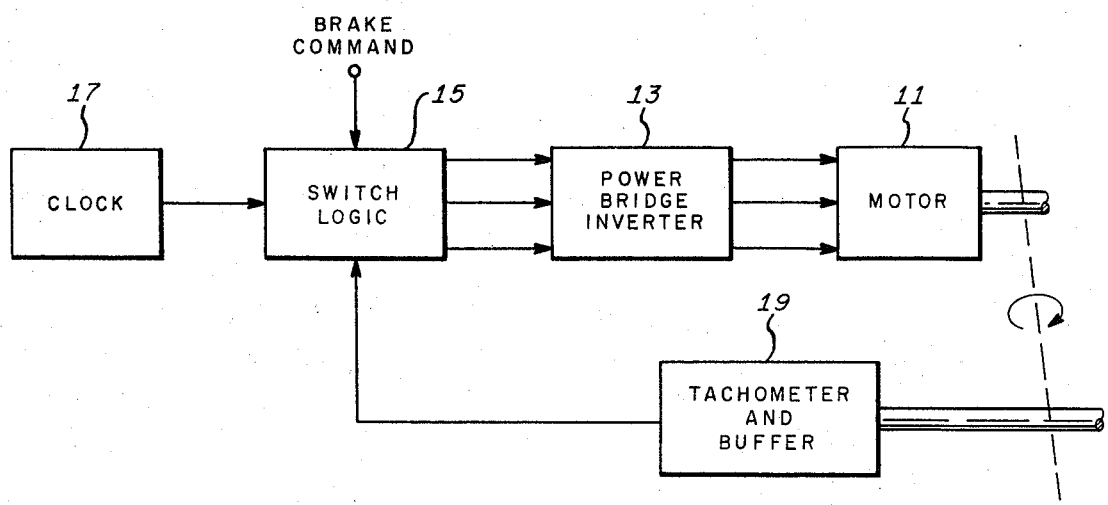
FIG. 1 is a block diagram illustrating a presently preferred embodiment of the invention in which the feedback signal represents a constant aliquot part of the prevailing rotor speed.

The braking system of FIG. 1 operates so that the rotation of the stator magnetic field occurs at a frequency that remains a constant aliquot part of the prevailing frequency of rotor rotation.

A two-phase motor 11 of FIG. 1 is driven through a power bridge inverter 13 from a switch logic circuit 15. Under normal running conditions, the stator windings of the motor 11 are energized in response to a square wave produced by the clock 17. A tachometer and buffer 19 is mechanically coupled to the shaft of the motor 11 so as to monitor the speed of rotation of the motor shaft. The electrical output from the tachometer and buffer is applied to the switch logic circuit 15.

When the motor is to be stopped, a brake command signal is applied to the switch logic which disconnects the clock 17 and substitutes the feedback signal the tachometer and buffer.

The clock 17 is adjusted to provide square waves at a frequency suitable for operating a motor at its specified running speed.

The switch logic circuit 15 consists basically of a double-throw switch and a quadrature phase splitter. The double-throw switch permits signals from the clock to pass to the quadrature phase splitter during normal running conditions or from the feedback loop to the quadrature phase splitter in response to a brake command signal.

The quadrature phase splitter serves to produce two-phase signals in response to the single train of pulses produced by the clock or by the feedback circuit. The quadrature phase splitter may be any one of a number of straightforward circuits that produce a pair of rectangular wavetrains in phase quadrature with each other. The quadrature phase splitter, may for instance, include a first scale-of-two multivibrator responsive to the positive-going pulses from the clock or feedback circuit, and a second scale-of-two multivibrator responsive to the negative-going portions of the same signal for each pole pair of the motor 11.

The power bridge inverter 13 includes straightforward bridge circuits for driving each phase of the motor. Thus, for the two-phase motor assumed, the power bridge inverter includes a pair of bridge circuits. Each bridge circuit in the inverter typically contains switching transistors in the bridge arms and means for connecting one of the motor stator coils across a diagonal of the bridge. The inverter effectively converts the output signals from the switch logic circuits into voltages suitable for driving the motor. The power bridge inverter is straight-forward and may, for instance, be similar to the bridge circuits shown on page 95 of the "Handbook of Electronic Control Circuits" by John Markus, published by McGraw-Hill Book Company in 1959.

The transistor circuits in the bridge arms permit stator winding current flow in one direction when the appropriate signal from the switch logic circuit is high and stator winding current flow in the opposite direction when the corresponding switch logic voltage is low.

The tachometer and buffer 19 includes a tachometer for sensing the actual rotor speed and a buffer circuit for shaping the wave produced by the tachometer. In a presently preferred embodiment, magnetic slugs are mounted on the rotor so as to induce voltage pulses in a pickup coil mounted on the stator and thus provide a pulse train having a pulse repetition rate that varies exactly with the rotor speed. This presently preferred embodiment produces four pulses for each pole pair per motor revolution. The resultant tachometer pulses generally consist of a relatively long ramp voltage followed by a rapidly changing voltage that crosses the zero axis as the slug passes by an associated pickup coil, followed by another ramp voltage that gradually returns to zero value. These pulses, developed by the tachometer, are applied to the buffer circuit which converts the tachometer pulses into pulses having a closely regulated amplitude and width so that they may drive the switch logic accurately. Typically, a flip-flop may be used in the buffer circuit for this purpose.

The tachometer is constructed so that the wavetrain applied to the switch logic circuit when the motor is at normal running speed has a pulse repetition rate that is a specified fraction of the pulse repetition rate of the clock source.

As presently preferred, the tachometer is constructed so that the resulting pulse train applied to the switch logic has a repetition rate that is one-half the pulse repetition rate of the clock when the motor is operating at its normal running speed. Under these conditions, maximum braking torque is realized. However, wide deviations in this fraction may be utilized in a reasonably efficient manner. During braking, the signal applied to the switch logic has a pulse repetition rate that always remains the same definite fraction of the pulse repetition rate that would be necessary to maintain the prevailing rotor speed. The motor thus operates in the "negative slip" region.

In some instances, it may be preferred to provide a feedback signal during braking whose pulse repetition rate is not necessarily an aliquot part of the pulse repetition rate necessary to maintain the prevailing rotational speed. A circuit of the type shown in FIG. 2 may be used in such situations.

Figure 2:
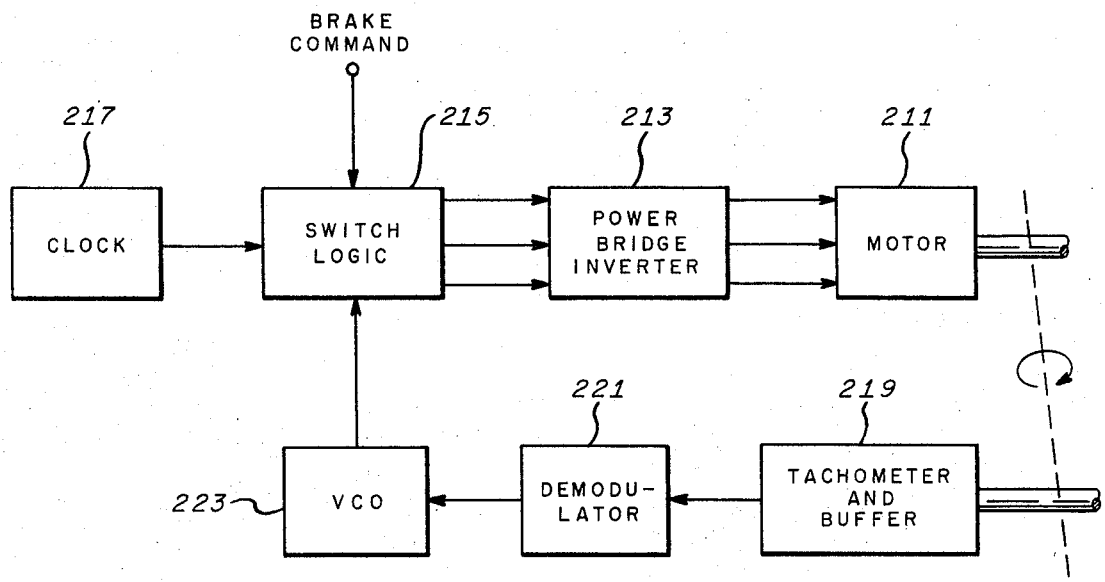
FIG. 2 is a block diagram illustrating another embodiment of the invention.

In the circuit of FIG. 2, a motor 211 is energized through a power bridge inverter 213 and a switch logic circuit 215. A clock source 217 provides a square wavetrain suitable for operating the motor at its normal running speed. A tachometer 219 is mechanically coupled to the shaft of the motor 211. The output of the tachometer is applied to a demodulator 221 which produces a DC voltage suitable for adjusting the frequency of a voltage controlled oscillator 223. The DC voltage from the demodulator is selected so that pulse repetition rate of the voltage controlled oscillator is less than the repetition rate necessary to maintain the prevailing rotor speed. Thus at the normal running speed of the rotor, the repetition rate of the wavetrain from the voltage controlled oscillator will be less than the repetition rate of the wavetrain from the clock 217. Although the repetition rate of the wavetrain from the oscillator 223 is less than the repetition rate of the clock 217 under these circumstances, it is not necessarily an aliquot art of the repetition rate of the clock signal as was the case in the embodiment of FIG. 1. As the motor 211 is brought to a stop, the repetition rate of the oscillator wavetrain always remains less than the repetition rate of a signal which would be required to maintain the prevailing rotor speed. The ratio of these repetition rates need not remain constant throughout the deceleration range of the motor.

The tachometer portion of 219 of the circuit of FIG. 2 is similar to that of the corresponding element in the circuit of FIG. 1. The buffer circuit converts the tachometer pulses into precise pulses. The demodulator 221 converts the pulses from the tachometer and buffer into a DC voltage having an amplitude representative of the pulse repetition rate of the wavelength from the tachometer and buffer. The demodulator 221 may be constructed in accordance with any one of a variety of known circuits. The demodulator may, for instance, contain a free-running multivibrator and an integrator. The multivibrator provides a symmetrical output wave in the absence of any signals from the tachometer and buffer. Signals from the tachometer and buffer may then be used to trigger the multivibrator prematurely on given half cycles and thereby distort the duty cycle of the output wave from the multivibrator. The output of the multivibrator may then be applied to the integrator. With no tachometer output signal, the integrator sees a symmetrical wavetrain and produces no output voltage. When triggering pulses are applied to the multivibrator, the duty cycle is distorted and the integrator produces a DC voltage having a magnitude that varies with rotor speed. The demodulator may also contain a source of steady DC voltage which is added to the output of the integrator so as to provide a suitable bias for operating the voltage controlled oscillator 223 at a frequency less than the frequency necessary to maintain the prevailing rotor speed. Thus the output of the voltage controlled oscillator always has a pulse repetition rate that is a determinable fraction of the motor speed, but not necessarily a constant fraction for all speeds and not necessary an aliquot part of the pulse repetition rate necessary to maintain prevailing rotor speed.

Motors are ordinarily designed to optimize the maximum permissible flux levels in the air gap of the machine and in the stator and rotor lamanations. During braking, continuous reduction of frequency might lead to abnormally high currents and some degradation in the available torque per ampere from the motor because of ferromagnetic flux limiting. Furthermore, if the duty cycle of the braking is high, the motor could overheat so that some form of current reduction would be advisable. Although such current reduction is not made necessary by the invocation of the principles of the present invention, such reduction is easily implemented if so desired.

Figure 3:
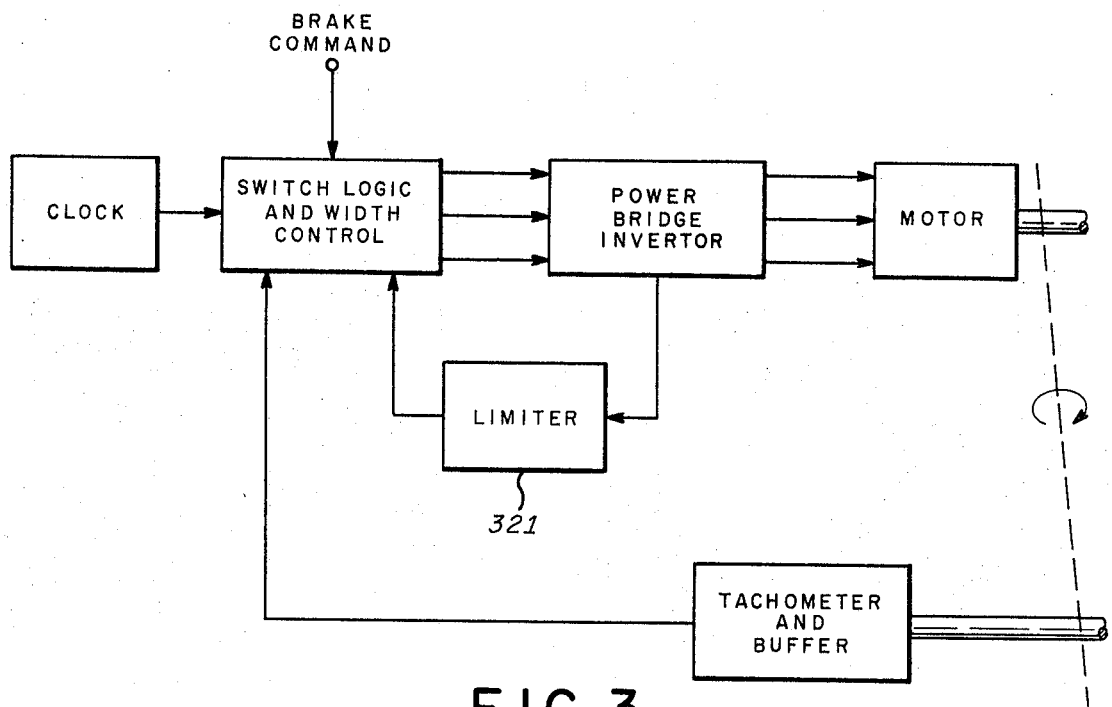
FIG. 3 is a block diagram illustrating a braking system of the type illustrated in FIG. 1, but employing a current limiting circuit.

FIG. 3 illustrates functionally how such current limiting may be accomplished. The circuit of FIG. 3 is basically that of FIG. 1 with the addition of a current limiter 321.

Figure 4:
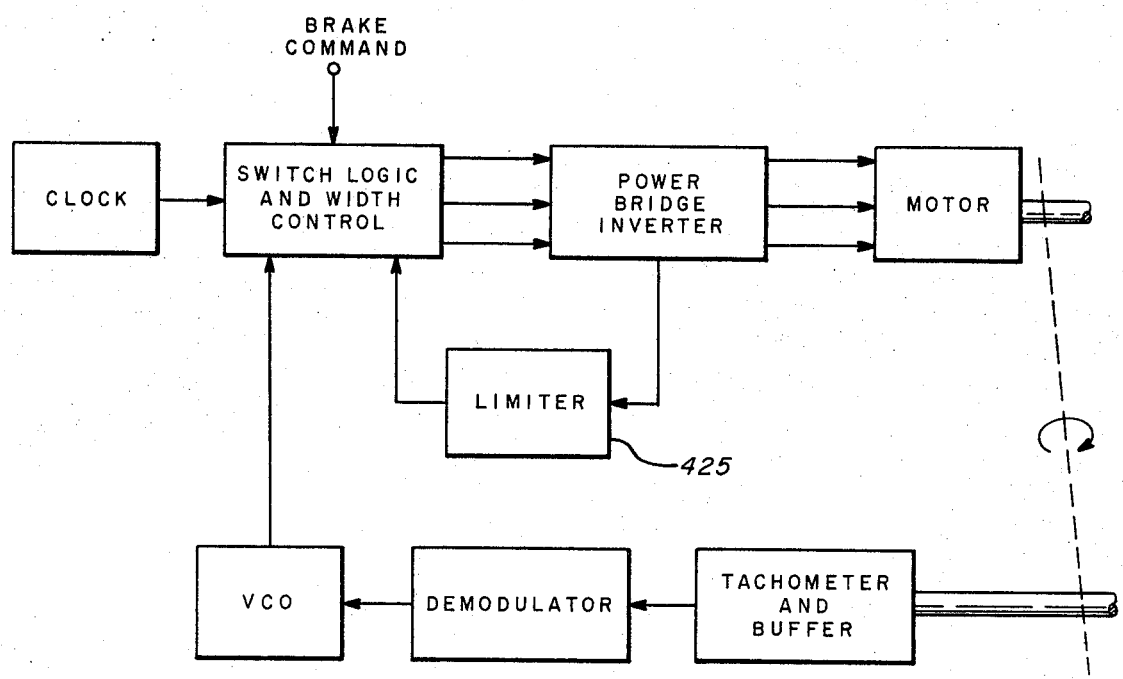
FIG. 4 is a block diagram illustrating a braking system of the type illustrated in FIG. 2 but employing a current limiting circuit.

Similarly, the motor of FIG. 2 may be modified to provide current limiting by the addition of a limiter 425 as pictured in FIG. 4.

In both of the circuits depicted in FIGS. 3 and 4, the limiter samples the current being supplied to the motor by the power bridge inverter and adjusts the duration of the pulses developed by the switching logic accordingly. Thus the limiter circuits may be adjusted to reduce the pulse duration when the limiter detects an abnormally high stator winding current. This will, in turn, reduce the pulse duration of the energy being supplied to the motor. Since energy supplied to the motor is proportional to the pulse duration, such reduction can reduce the energy being dissipated in the motor to a safe operating level.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A braking circuit for use with an induction motor of the type normally energized in response to signals from a constant frequency clock source, said signals having a pulse repetition rate corresponding to the normal running speed of the motor, said braking circuit comprising means to monitor the speed of said motor, means responsive to said monitoring means for providing a feedback signal having a pulse repetition rate corresponding to a motor speed less than that sensed by said monitoring means, and switching means for optionally energizing said motor from said clock source or from said feedback signal.

2. The apparatus of claim 1 further including a power bridge inverter interconnecting said switching means and said motor, said inverter being constructed to convert signals from said switching means into signals suitable for driving said motor.

3. The apparatus of claim 2 in which said switching means is connected to respond to an externally applied brake command signal, said switching means being constructed to pass a signal only from said clock means in the absence of a brake command signal and to pass only a feedback signal in the presence of a brake command signal.

4. The apparatus of claim 3 in which said monitoring means includes a digital tachometer for producing a specified number of pulses for each revolution of the motor shaft.

5. The apparatus of claim 4 further including a buffer means for converting the pulses from said tachometer into pulses suitable for driving said power bridge inverter.

6. The apparatus of claim 4 further including a voltage controlled oscillator and a demodulating means, said demodulating means being constructed to provide a DC signal having a magnitude indicative of the pulse repetition rate of a signal from said tachometer, said oscillator being constructed and arranged to provide a signal to said switching means that varies with the magnitude of said DC signal.

* * * * *